(12) United States Patent
Liu et al.

(10) Patent No.: US 8,468,821 B2
(45) Date of Patent: Jun. 25, 2013

(54) DUAL-LOOP CONTROL SYSTEMS AND METHODS FOR A SEQUENTIAL TURBOCHARGER

(75) Inventors: Zhiping Steven Liu, Canton, MI (US); Anupam Gangopadhyay, Mrc Nagar (IN)

(73) Assignee: GM Global Technology Operations LLC

( * ) Notice: Subject to any disclaimer, the term of this patent is extended or adjusted under 35 U.S.C. 154(b) by 720 days.

(21) Appl. No.: 12/621,808

(22) Filed: Nov. 19, 2009

(65) Prior Publication Data

US 2011/0113773 A1  May 19, 2011

(51) Int. Cl.
*F02D 23/00* (2006.01)

(52) U.S. Cl.
USPC .................................. 60/602; 60/600; 60/611

(58) Field of Classification Search
USPC .................... 60/600, 602, 608, 611
See application file for complete search history.

(56) References Cited

U.S. PATENT DOCUMENTS

| | | | | |
|---|---|---|---|---|
| 5,063,744 A * | 11/1991 | Ishiyama et al. | | 60/600 |
| 6,311,493 B1 * | 11/2001 | Kurihara et al. | | 60/600 |
| 6,378,308 B1 * | 4/2002 | Pfluger | | 60/612 |
| 6,510,691 B1 * | 1/2003 | Schmid | | 60/602 |
| 2006/0070381 A1 * | 4/2006 | Parlow et al. | | 60/612 |
| 2006/0123782 A1 * | 6/2006 | Rosin et al. | | 60/599 |
| 2007/0295007 A1 * | 12/2007 | McNulty et al. | | 60/602 |
| 2011/0113773 A1 * | 5/2011 | Liu et al. | | 60/602 |

* cited by examiner

*Primary Examiner* — Thomas Denion
*Assistant Examiner* — Patrick Maines

(57) ABSTRACT

A system for a sequential turbocharger includes a loop control module, a set-point module, and a loop operation module. The loop control module generates a loop control mode signal based on an engine speed signal and an engine load signal. The loop control mode signal indicates one of a single-loop control mode and a dual-loop control mode. The set-point selection module determines at least one of a boost pressure set-point value and an exhaust pressure set-point value based on the loop control mode signal, the engine speed signal, and an engine torque signal. The loop operation module operates at least one of a variable geometry turbine and a bypass valve of the sequential turbocharger during the single-loop control mode based on the boost pressure set-point value, and during the dual-loop control mode based on the boost pressure set-point value and the exhaust pressure set-point value.

20 Claims, 4 Drawing Sheets

DUAL-LOOP CONTROL SYSTEMS AND METHODS FOR A SEQUENTIAL TURBOCHARGER

FIELD

The present disclosure relates to internal combustion engines, and more particularly to sequential turbocharger control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine (ICE) may use a sequential turbocharger to increase torque output by delivering additional air into cylinders of the ICE. The sequential turbocharger may be a two-stage turbocharger system. The sequential turbocharger may include a high-pressure turbocharger and a low-pressure turbocharger that are arranged in series. The high-pressure turbocharger may include a high-pressure turbine and a high-pressure compressor. The low-pressure turbocharger may include a low-pressure turbine and a low-pressure compressor.

The high-pressure turbine and the low-pressure turbine may be controlled separately to adjust flow of exhaust gas. The exhaust gas flows through the high-pressure turbine and then through the low-pressure turbine when the engine is operating at low speeds, i.e., speeds less than a predetermined speed. The exhaust gas may bypass the high-pressure turbine and flows through the low-pressure turbine when the engine is operating at high speeds, i.e., speeds greater than or equal to the predetermined speed. The flow of exhaust gas through the turbines can reduce response time of turbocharger boost, referred to as turbo lag.

The turbo lag may be controlled using a bypass valve (BPV) and a variable geometry turbine (VGT). The high-pressure turbine may include the BPV and the VGT. The VGT has a set of movable vanes that are used to control pressure of the exhaust gas flowing through the VGT. The flow of exhaust gas rotates the vanes. Adjusting the openings of the vanes may adjust the acceleration rate of the VGT. The acceleration rate of the VGT tends to increase as the vanes are closed. Boost pressure that is provided to the high-pressure compressor in the high-pressure turbocharger is increased when the acceleration rate is increased. The vanes of the VGT are gradually opened to reduce speed of the VGT as the boost pressure increases. Reducing speed of the VGT prevents the boost pressure that is provided to the high-pressure compressor from exceeding a predetermined level. The BPV may open to redirect the flow of exhaust gas through the BPV when the VGT is operating at high speeds. The BPV opens to relieve the boost pressure of the VGT before the boost pressure exceeds the predetermined level.

SUMMARY

In one embodiment, a system is provided that includes a loop control module, a set-point module, and a loop operation module. The loop control module generates a loop control mode signal based on an engine speed signal and an engine load signal. The loop control mode signal indicates one of a single-loop control mode and a dual-loop control mode. The set-point selection module determines at least one of a boost pressure set-point value and an exhaust pressure set-point value based on the loop control mode signal, the engine speed signal, and an engine torque signal. The loop operation module operates at least one of a variable geometry turbine (VGT) and a bypass valve (BPV) of the sequential turbocharger during the single-loop control mode based on the boost pressure set-point value, and during the dual-loop control mode based on the boost pressure set-point value and the exhaust pressure set-point value.

In other features, a method of controlling a sequential turbocharger is provided. The method includes generating a loop control mode signal based on an engine speed signal and an engine load signal. The loop control mode signal indicates one of a single-loop control mode and a dual-loop control mode. At least one of a boost pressure set-point value and an exhaust pressure set-point value is determined based on the loop control mode signal, the engine speed signal, and an engine torque signal. At least one of a variable geometry turbine (VGT) and a bypass valve (BPV) of the sequential turbocharger is operated during the single-loop control mode based on the boost pressure set-point value, and during the dual-loop control mode based on the boost pressure set-point value and the exhaust pressure set-point value.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
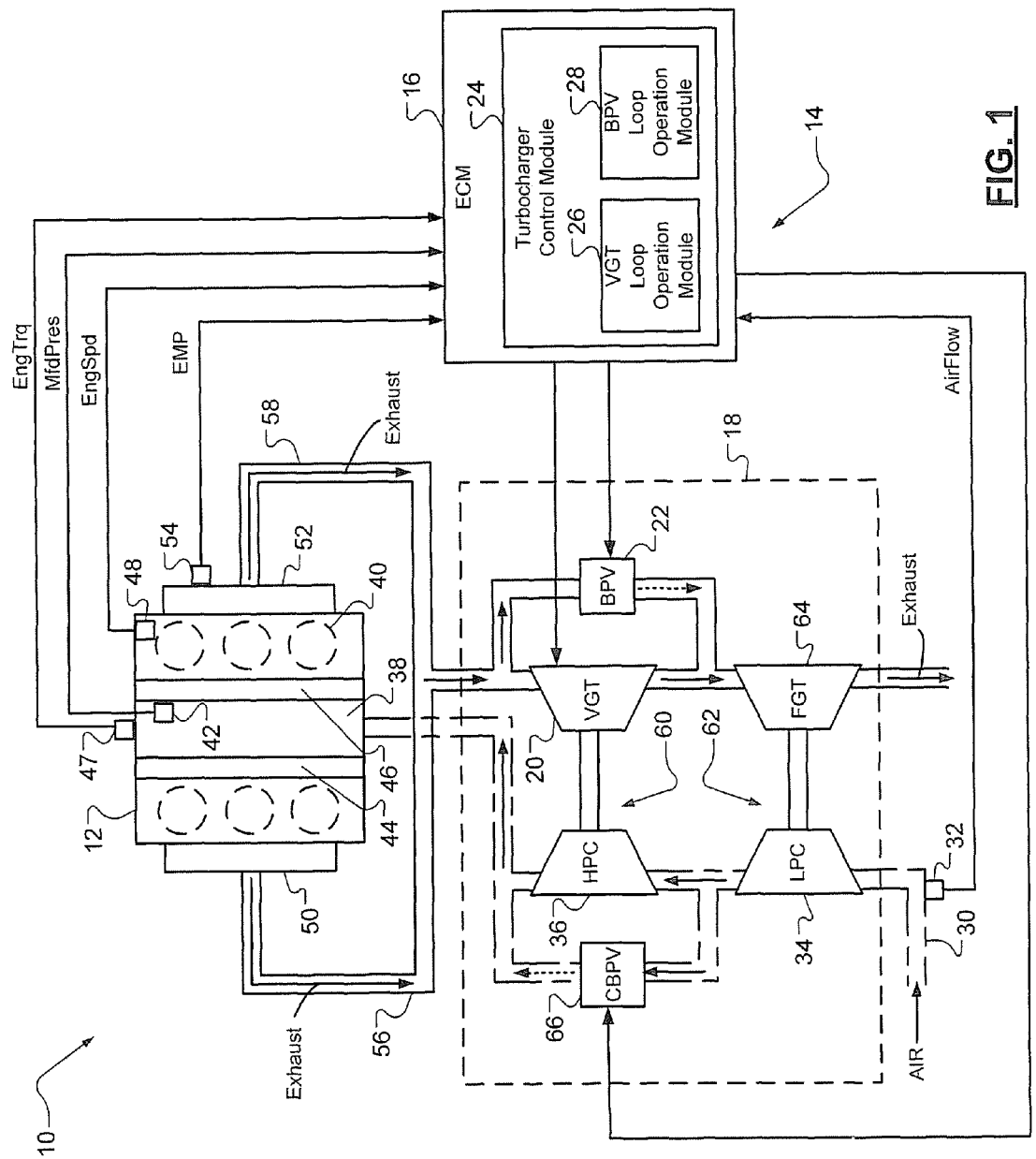
FIG. 1 is a functional block diagram of an engine control system in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, and/or a combinational logic circuit.

An engine may be configured with a sequential turbocharger to regulate airflow supplied to cylinders of the engine. The airflow may be controlled by multiple control actuators. The control actuators may include a VGT and a BPV. The VGT and BPV operate in different control modes under different engine conditions. The control modes may include a single-loop control mode and a dual-loop control mode. The single-loop control mode includes the actuation of the VGT and BPV based on boost pressure delivered to the VGT. The single-loop control mode may use a boost pressure set-point as a control target. The dual-loop control mode includes the actuation of the VGT and BPV based on the boost pressure and an exhaust pressure of the engine. The dual-loop control system may use the boost pressure set-point and the exhaust pressure set-point as control targets.

Figure 4:
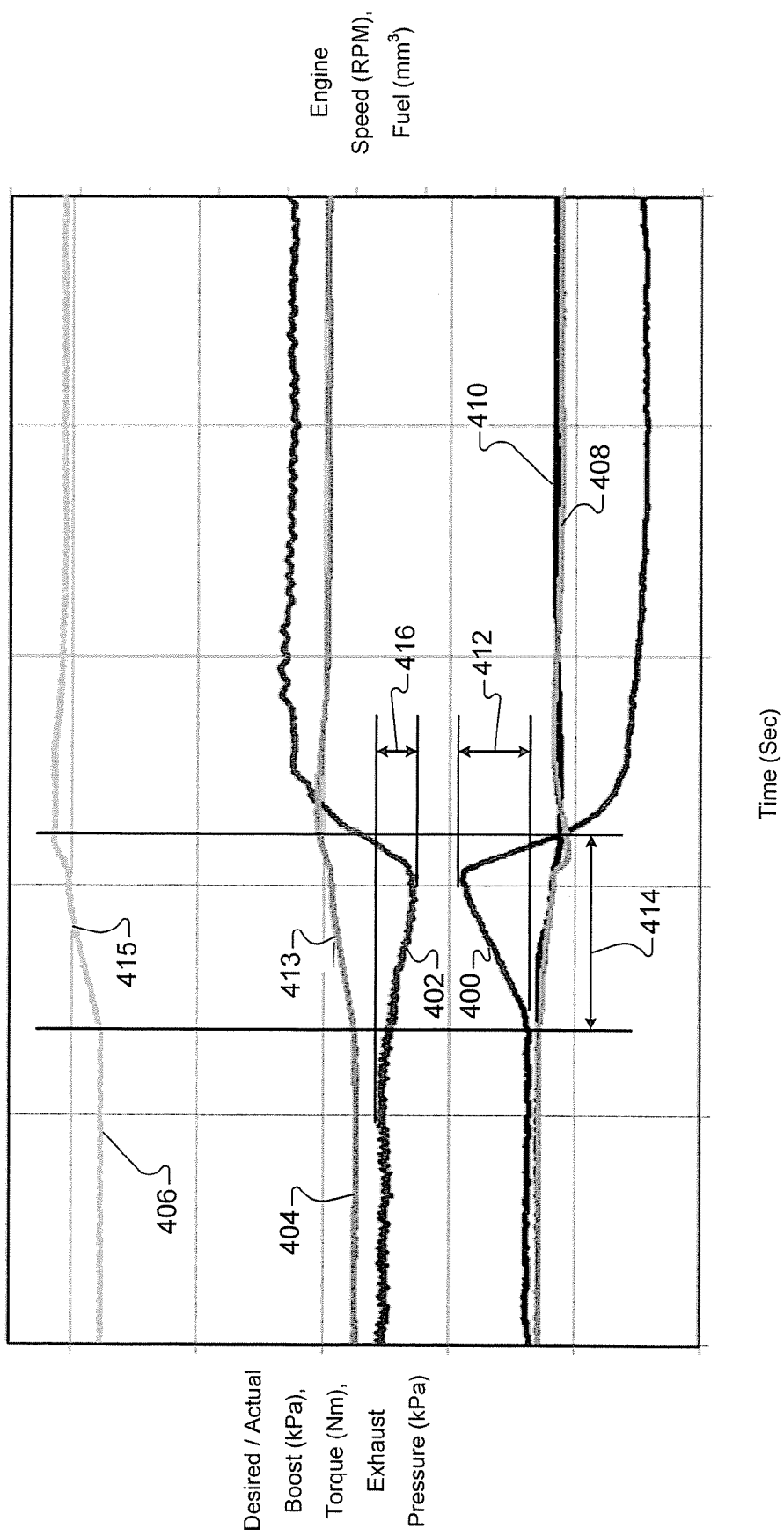
FIG. 4 is an exemplary plot of an exhaust manifold pressure signal, an engine torque signal, an engine speed signal, a fuel rate signal, an actual boost pressure signal, and a boost pressure set-point signal in accordance with an embodiment of the present disclosure.

Although the boost pressure may be controlled by the actuation of the VGT and BPV, unsteady engine operation, such as an engine torque loss, may occur when the BPV is initially opened or fully closed. An exhaust back pressure (EBP) may rapidly change when the BPV transitions from an open position to a fully closed position or conversely from the fully closed position to an open position. The EBP causes an exhaust pressure increase which may result in the engine torque loss. An example of engine torque loss is shown in FIG. 4.

Smooth transient operation of the sequential turbocharger is desired to meet emission targets, to satisfy fuel economy targets, and to improve drivability. Smooth transient operation is provided by minimizing changes in boost pressures and engine torque loss due to actuation of a VGT and a BPV. Transient operation can be unsteady due to highly non-linear characteristics of control actuators for the VGT and the BPV.

The embodiments of the present disclosure provide techniques for controlling and providing smooth transient operation of a sequential turbocharger. The techniques reduce changes in boost pressures and engine torque caused by control actuators during control modes of the sequential turbocharger. This increases fuel efficiency and improves engine durability while satisfying emission requirements.

In FIG. 1, an exemplary engine control system 10 of a vehicle is shown. The engine control system 10 may include an engine 12 and a turbocharger control system 14. The turbocharger control system 14 may include an engine control module 16 and a two-stage turbocharger system 18. The two-stage turbocharger system 18 actuates a VGT 20 and a BPV 22 to control an amount of air supplied to the engine 12.

Figure 2:
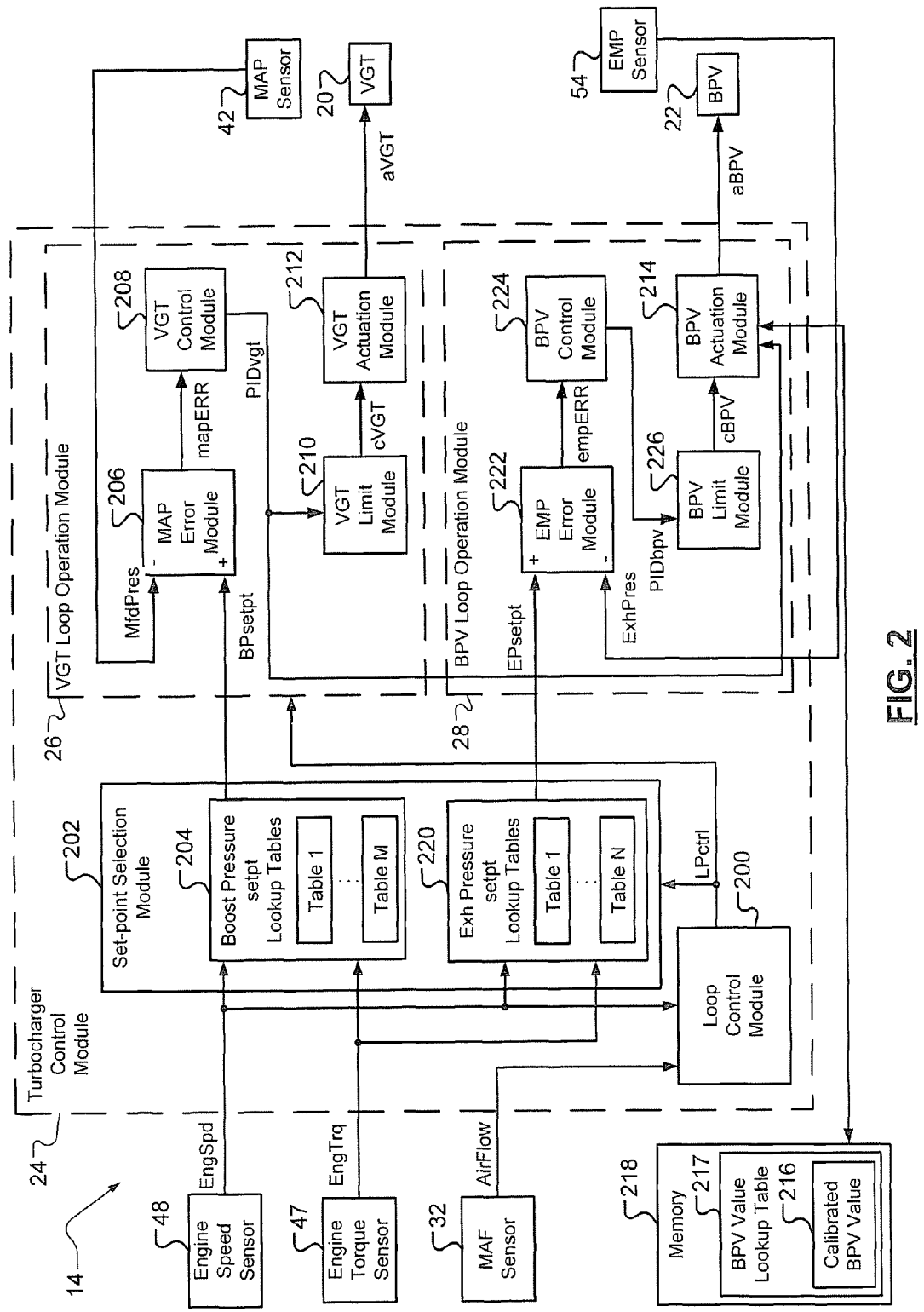
FIG. 2 is a functional block diagram of a dual-loop control system in accordance with an embodiment of the present disclosure.

The engine control module 16 may include a turbocharger control module 24. The turbocharger control module 24 coordinates control of the VGT 20 and the BPV 22. The turbocharger control module 24 may include a VGT loop operation module 26 and a BPV loop operation module 28. The VGT loop operation module 26 controls opening and closing of vanes in the VGT 20 based on boost pressure of the VGT and a manifold absolute pressure (MAP) signal. An example of the VGT loop operation module is illustrated in FIG. 2. The BPV loop operation module 28 controls opening and closing of the BPV 22 based on an exhaust pressure of the engine and an exhaust manifold pressure (EMP) signal. An example of the BPV loop operation module is illustrated also in FIG. 2.

During engine operation, air passes through an inlet 30 through a mass airflow (MAF) sensor 32. The MAF sensor 32 generates a MAF signal AirFlow that indicates a rate of airflow through the MAF sensor 32. After flowing through the MAF sensor 32, the air passes through a low-pressure compressor 34 and a high-pressure compressor 36 of the two-stage turbocharger system 18. The air is drawn into an intake manifold 38. The air within the intake manifold 38 is distributed into cylinders 40. Although FIG. 1 depicts six cylinders, the engine 12 may include any number of cylinders 40.

A MAP sensor 42 may detect an air pressure within the intake manifold 38 and generate a MAP signal MfdPres. The MAP sensor 42 is positioned in the intake manifold 38 between the inlet 30 and the engine 12. The MAP signal MfdPres indicates air pressure in the intake manifold 38. An intake air temperature (IAT) sensor (not shown) located in the intake manifold 38 generates an IAT signal based on intake air temperature.

Fuel is combined with the air and drawn into the cylinders 40 via fuel rails 44, 46. While a gasoline powered internal combustion engine is shown, the embodiments disclosed herein apply to diesel or alternative fuel sourced engines. An air/fuel mixture is compressed and ignited in the cylinders 40 to produce drive torque. An engine torque sensor 47 may generate an engine torque signal EngTrq corresponding to an output torque of the engine 12. The drive torque may increase an engine speed. An engine speed sensor 48 may generate an engine speed signal EngSpd that indicates a speed of the engine 12 in revolutions per minute (RPM). Combustion exhaust within the cylinders 40 is forced out via exhaust manifolds 50, 52.

An EMP sensor 54 may generate an exhaust manifold pressure signal EMP that corresponds to a pressure of an exhaust gas in the exhaust manifolds 50, 52. The exhaust manifold pressure may also be derived from other sensors typically found on the engine 12. The other sensors may include a requested fuel quantity signal, a requested injection timing signal, and an engine coolant temperature sensor. The exhaust gas travels through exhaust conduits 56, 58, and is directed to the two-stage turbocharger system 18.

The two-stage turbocharger system 18 may include a high-pressure turbocharger 60 and a low-pressure turbocharger 62. The high-pressure turbocharger 60 may include the VGT 20 and the high-pressure compressor 36. The high-pressure compressor 36 spins and forces air into the cylinders 40 when the exhaust gas flows through the VGT 20. The VGT 20 may have a set of movable vanes (not shown) that are used to control pressure of the exhaust gas through the high-pressure turbocharger 60.

The low-pressure turbocharger 62 may include a fixed geometry turbine (FGT) 64 and the low-pressure compressor 34. The exhaust gas through the FGT 64 causes the low-pressure compressor 34 to spin and compress air. The exhaust gas flows from the exhaust manifolds 50, 52 into the VGT 20 and then through the FGT 64 when the engine 12 is operating at low speeds. By allowing exhaust gas to flow through the high-pressure turbocharger 60 and then the low-pressure turbocharger 62, turbo lag may be reduced. As the engine speed increases, the BPV 22 may open to bypass the exhaust gas flow and allow the exhaust gas to flow through the FGT 64. A compressor bypass valve (CBPV) 66 may operate in conjunction with the BPV 22. In another embodiment, the CBPV 66 and the BPV 22 may operate independently. The CBPV 66 prevents the high-pressure compressor 36 from spinning faster than a predetermined speed, causing harm to the two-stage turbocharger system 18.

In FIG. 2, the turbocharger control system 14 for the VGT 20 and BPV 22 of the two-stage turbocharger system 18 is shown. The turbocharger control system 14 may include the turbocharger control module 24 that includes the VGT loop operation module 26, the BPV loop operation module 28, a loop control module 200, and a set-point selection module 202.

The loop control module 200 may generate a loop control mode signal LPctrl based on an engine speed signal EngSpd and an engine load signal EngLd. The engine load signal EngLd may be determined based on a MAF signal AirFlow. The MAF signal AirFlow may be generated by the MAF sensor 32. The MAF signal AirFlow indicates a rate of airflow through the inlet 30 of the intake manifold 38. The engine speed signal EngSpd may be generated by the engine speed sensor 48.

The loop control mode signal LPctrl indicates a loop control mode in which the VGT 20 and the BPV 22 are operated. The loop control mode may be one of a single-loop control mode and a dual-loop control mode. The single-loop control mode indicates that the turbocharger control system 14 is controlled based on boost pressure of the VGT 20. The boost pressure may be detected by the MAP sensor 42. The dual-loop control mode indicates that the turbocharger control system 14 is controlled based on the boost pressure and exhaust pressure of the engine 12. The exhaust pressure may be detected by the EMP sensor 54.

The set-point selection module 202 may select at least one of a boost pressure set-point value BPsetpt and an exhaust pressure set-point value EPsetpt based on the loop control mode signal LPctrl, the engine speed signal EngSpd, and the MAF signal AirFlow. The loop control mode signal LPctrl indicates one of a single-loop control mode and a dual-loop control mode. The turbocharger control system 14 may transition between the single-loop control mode and the dual-loop control mode based on the engine speed and the engine load.

In the single-loop control mode, the set-point selection module 202 may select a boost pressure set-point value BPsetpt based on the engine speed signal EngSpd and the engine torque signal EngTrq. For example only, the set-point selection module 202 may selectively access a boost pressure set-point value BPsetpt from boost pressure set-point lookup tables 204. The boost pressure set-point lookup tables 204 may include a set of tables (e.g. Tables 1–M, where M is an integer) indexed based on the engine speed signal EngSpd and the engine torque signal EngTrq.

The VGT loop operation module 26 may include a MAP error module 206, a VGT control module 208, a VGT limit module 210, and a VGT actuation module 212. The MAP error module 206 may generate a MAP error signal mapERR based on the boost pressure set-point value BPsetpt and the MAP signal MfdPres. The MAP error module 206 compares the boost pressure set-point value BPsetpt to the MAP signal. The MAP error module 206 generates the MAP error signal mapERR that represents a difference between the boost pressure set-point value BPsetpt and the MAP signal MfdPres.

The VGT control module 208 may generate a VGT control signal PlDvgt based on the MAP error signal malERR. The VGT control module 208 may be a single input single output (SISO) control module or a multiple input multiple output (MIMO) control module. For example, the VGT control module 208 may be a proportional integral derivative (PID) control module or a variation thereof (e.g. a PI control module).

Additionally, during the single-loop control mode, the VGT control module 208 may perform as a governer splitter to actuate the VGT 20 and BPV 22 of the turbocharger control system 14. The governer splitter refers to a system that controls two actuators (e.g. VGT and BPV) based on one set-point (e.g. boost pressure). For example only, the BPV actuation module 214 receives the VGT control signal PlDvgt and accesses a calibrated BPV value 216 stored in memory 218 based on the VGT control signal PlDvgt. The calibrated BPV value 216 may be stored in a BPV value lookup table 217 and may be determined initially during manufacturing of a vehicle. The BPV value lookup table 217 may include a different set of calibrated BPV values 216 depending on an amount that the vanes in the VGT 20 are opened. The BPV actuation module 214 may actuate the BPV 22 based on the calibrated BPV value 216.

The VGT limit module 210 receives and scales the VGT control signal PlDvgt to be within an operating range of the VGT 20. For example, if 0 represents a VGT closed state and 1 represents a VGT open state, the VGT limit module 210 may scale the VGT control signal PlDvgt to a value between 0 and 1. The VGT limit module 210 generates a scaled VGT signal cVGT based on the VGT control signal PlDvgt. The VGT actuation module 212 may generate a VGT actuation signal aVGT based on the scaled VGT signal cVGT to actuate the vanes in the VGT 20.

In the dual-loop control mode, the set-point selection module 202 may select the boost pressure set-point value BPsetpt and an exhaust pressure set-point value EPsetpt based on the engine speed signal EngSpd and the engine torque signal EngTrq. For example only, the set-point selection module 202 may selectively access an exhaust pressure set-point value from exhaust pressure set-point lookup tables 220. The exhaust pressure set-point lookup tables 220 may include a set of tables (e.g. Tables 1-N, where N is an integer) indexed based on the engine speed signal EngSpd and the engine torque signal EngTrq.

The BPV loop operation module 28 may receive the exhaust pressure set-point value EPsetpt from the set-point selection module 202. The BPV loop operation module 28 may include an EMP error module 222, a BPV control module 224, a BPV limit module 226, and the BPV actuation module 214. The EMP error module 222 may generate an EMP error signal empERR based on the exhaust pressure set-point value EPsetpt and an EMP signal ExhPres. The EMP error module 222 compares the exhaust pressure set-point value EPsetpt to the EMP signal ExhPres. The EMP error module 222 generates the EMP error signal empERR that represents a difference between the exhaust pressure set-point value EPsetpt and the EMP signal ExhPres.

The BPV control module 224 may generate a BPV control signal PIDbpv based on the EMP error signal empERR. The BPV control module 224 may be a SISO control module or a MIMO control module. For example, the BPV control module 224 may be a PID control module or a variation thereof (e.g. a PI control module).

The BPV limit module 226 receives and scales the BPV control signal PIDbpv to be within an operating range of the BPV 22. For example, if 0 represents a BPV closed state and 1 represents a BPV open state, the BPV limit module 226 may scale the BPV control signal PIDbpv to a value between 0 and 1. The BPV limit module 226 generates a scaled BPV signal cBPV based on the BPV control signal PIDbpv. The BPV actuation module 214 may receive the scaled BPV signal cBPV and generate a BPV actuation signal aBPV based on the scaled BPV signal cBPV to actuate the BPV 22.

The VGT loop operation module 26 and the BPV loop operation module 28 may be combined into a single module or may be distinct modules. Other modules, such as the limit modules 210, 226, may be combined into a single module or may be distinct modules. Additionally, the actuation modules 212, 214 may be a single module that actuates the VGT 20 and the BPV 22.

Figure 3:
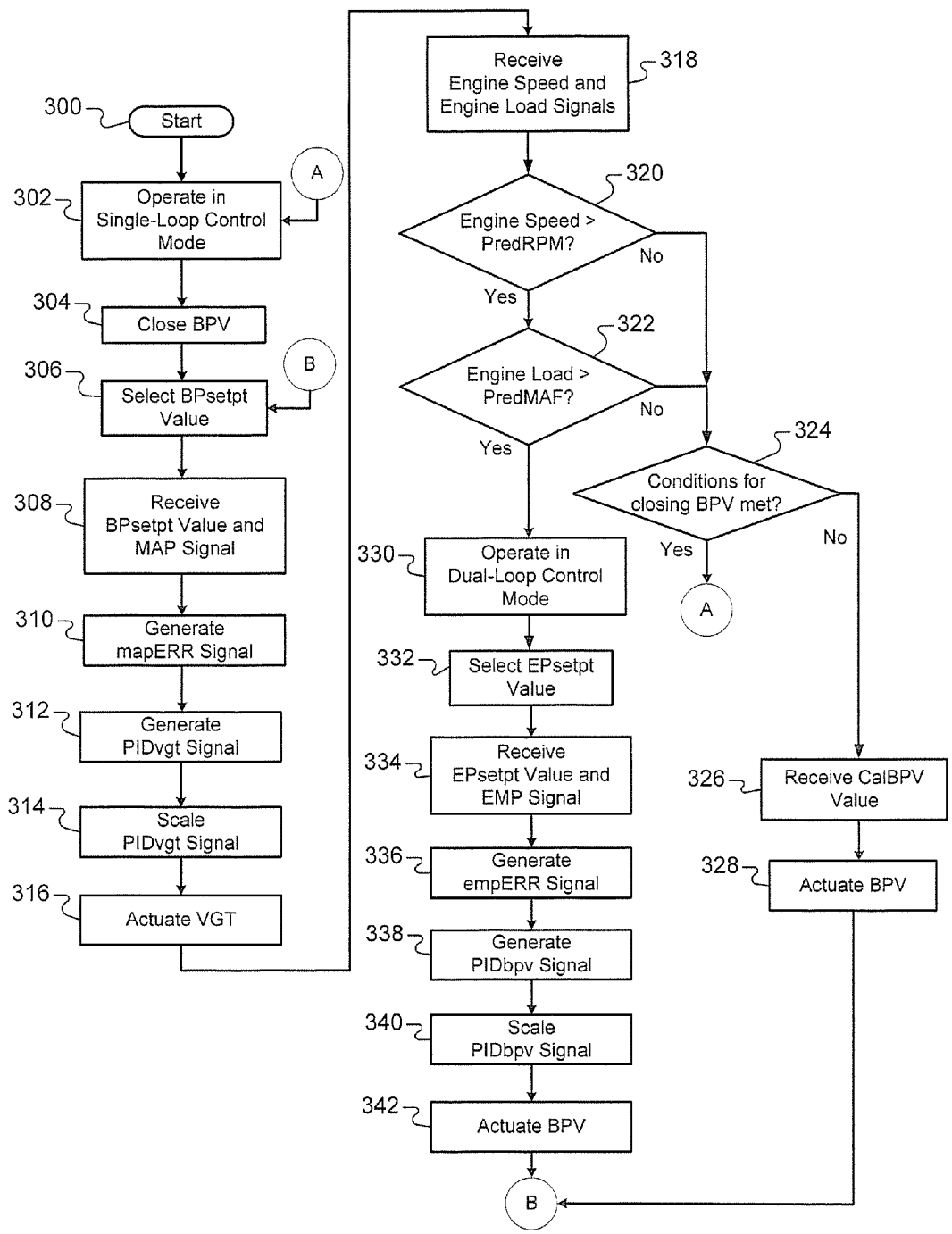
FIG. 3 illustrates a method of controlling a VGT and a BPV in accordance with an embodiment of the present disclosure.

In FIG. 3, an exemplary method of controlling the VGT 20 and the BPV 22 of the turbocharger control system 14 is shown. Although the following steps are primarily described with respect to the embodiments of FIGS. 1-2, the steps may be modified to apply to other embodiments of the present disclosure. Control of a control module, such as the turbocharger control module 24 of FIG. 1 may perform the following steps.

The method may begin at step 300. In step 302, the loop control module 200 may initially generate a loop control signal LPctrl that indicates a single-loop control mode. The single-loop control mode indicates that the turbocharger control system 14 is controlled based on boost pressure of the VGT 20. The boost pressure may be detected by the MAP sensor 42.

In step 304, the BPV actuation module 214 actuates the BPV 22 to a fully closed position. Although the BPV 22 may be initially closed when the single-loop control mode is first initiated, the BPV 22 may be actuated by the BPV actuation module 214 based on the calibrated BPV value 216 stored in memory 218. Steps 326-328 illustrate an actuation of the BPV 22 during the single-loop control mode using the calibrated BPV value 216.

In step 306, the set-point selection module 202 may selectively access a boost pressure set-point value BPsetpt from the boost pressure set-point lookup tables 204 based on the loop control signal LPctrl, an engine speed signal EngSpd, and an engine torque signal EngTrq. For example, the set-point selection module 202 selects the boost pressure set-point lookup tables 204 when the VGT 20 is in the single-loop control mode. The set-point selection module 202 accesses the boost pressure set-point value BPsetpt stored in the boost pressure set-point lookup tables 204. The boost pressure set-point lookup tables 204 are indexed based on the engine speed signal EngSpd and the engine torque signal EngTrq.

Although the engine torque sensor 47 may generate the engine torque signal EngTrq, the engine torque signal EngTrq may also be generated based on rates that fuel is injected into cylinders 40 of the engine 12 at each injection. For example, a fuel injection system (not shown) may determine fuel rates injected into the cylinders 40 of the engine 12 at each injection. The fuel rates may indicate an amount of fuel present in cylinders 40 during an operating cycle of an internal combustion engine. The operating cycle may refer to a combustion cycle that includes a set of four engine strokes.

In step 308, the MAP error module 206 receives the boost pressure set-point value BPsetpt from the set-point selection module 202. The MAP error module 206 also receives a MAP signal MfdPres from the MAP sensor 42. The MAP signal indicates air pressure in the intake manifold 38. In step 310, the MAP error module 206 may generate a MAP error signal mapERR based on the boost pressure set-point value BPsetpt and the MAP signal MfdPres. The MAP error module 206 compares the boost pressure set-point value BPsetpt to the MAP signal. The MAP error module 206 generates the MAP error signal mapERR based on a difference between the boost pressure set-point value BPsetpt and the MAP signal MfdPres.

In step 312, the VGT control module 208 may generate a VGT control signal PIDvgt based on the MAP error signal mapERR. The VGT control module 208 may be a PID control module with proportional P, integral I, and derivative D values. The MAP error signal mapERR is provided based on the boost pressure set-point value BPsetpt and the MAP signal MfdPres to achieve desired P, I, and D values for a desired control response. The desired values may provide smooth transient operation during the single-loop control mode. An additional set-point value, such as an exhaust pressure set-point value EPsetpt, may further improve smooth transient operation during the dual-loop control mode.

In step 314, the VGT limit module 210 may receive and scale the VGT control signal PIDvgt to be within an operating range of the VGT 20. For example, if 0 represents a VGT closed state and 1 represents a VGT open state, the VGT limit module 210 may scale the VGT control signal PIDvgt to a value between 0 and 1. The VGT limit module 210 generates a scaled VGT signal cVGT based on the VGT control signal PIDvgt.

In step 316, the VGT actuation module 212 may generate a VGT actuation signal aVGT based on the scaled VGT signal cVGT to actuate the vanes in the VGT 20. In step 318, the loop control module 200 may receive the engine speed signal EngSpd from the engine speed sensor 48 and the MAF signal AirFlow from the MAF sensor 32. The MAF signal AirFlow may be used to indicate an engine load. The engine load may be determined based on the MAF signal AirFlow that indicates a rate of airflow through the inlet 30 of the intake manifold 38.

In step 320, the loop control module 200 receives the engine speed signal EngSpd and determines whether the engine speed signal EngSpd is greater than a predetermined speed PredRPM. Control may proceed to step 322 when the engine speed signal EngSpd is greater than the predetermined speed PredRPM, otherwise control may proceed to step 324.

In step 322, the loop control module 200 receives the MAF signal AirFlow and determines whether the engine load is greater than a predetermined value PredMAF. Control may proceed to step 330 when the MAF signal AirFlow that indicate the engine load is greater than the predetermined value PredMAF, otherwise control may proceed to step 324. The VGT 20 and the BPV 22 may be actuated in the dual-loop control mode when the conditions of steps 320 and 322 are satisfied.

In step 324, the loop control module 200 determines whether the BPV 22 may be fully closed. Conditions for closing the BPV 22 may be satisfied based on a relationship between the engine speed signal EngSpd and the engine load signal EngLd. For example only, a first condition may be satisfied when the engine speed signal EngSpd is less than an engine speed threshold for a predetermined period. As another example, a second condition may be satisfied when the engine load signal EngLd is less than an engine load threshold for the predetermined period. The relationship may be stored in a calibrated lookup table in memory 218. Control may return to step 302 when the conditions are satisfied, otherwise control may proceed to step 326.

In step 326, the VGT control module 208 may perform as a governor splitter to actuate the VGT 20 and BPV 22 during the single-loop control mode based on a single set-point, such as the boost pressure set-point value BPsetpt. For example, the BPV actuation module 214 may receive the VGT control signal PIDvgt and access a calibrated BPV value 216 stored in the memory 218 based on the VGT control signal PIDvgt. The calibrated BPV value 216 may be stored in the BPV value lookup table 217 and may be initially determined during manufacturing of a vehicle. The BPV value lookup table 217 may include a different set of calibrated BPV values 216 depending on an amount of openings of the vanes in the VGT 20.

For example only, the calibrated BPV value 216 may be determined by a ratio between a first opening area of the BPV 22 and a second opening area of the vanes in the VGT 20. The first and second opening areas may be characterized as percentages as to maximum opening areas for the BPV 22 and the VGT 20 respectively.

In step 328, the BPV actuation module 214 may adjust the opening area of the BPV 22 based on the calibrated BPV value 216. Although the BPV 22 may be actuated based on the calibrated BPV value 216 during the single-loop control mode, a fluctuation in the exhaust pressure may cause an engine power loss resulting in unsmooth transient operation. The engine power loss detected by the engine torque sensor 47 may be reduced by introducing an additional set-point, such as the exhaust pressure set-point value EPsetpt.

For example only, referring now also to FIG. 4, an exemplary plot of the EMP signal 400, the engine torque signal 402, the engine speed signal 404, a fuel rate signal 406, an actual boost pressure signal 408, and a boost pressure set-point signal 410 generated during the single-loop control mode is shown. The exemplary plot illustrates variations of the signals 400, 402 during a transition between an open state and a closed state of the BPV 22.

An increase in the EMP signal 400 (designated 412) during a predetermined period 414 indicates a fluctuation in the exhaust pressure of an exhaust system. The fluctuation may be caused by an exhaust back pressure (EBP) when the BPV 22 is opened rapidly, which restricts a flow of exhaust gas in the exhaust system. An EBP sensor may be used to generate an EBP signal that indicates the EBP of the exhaust system.

An increase in the EMP may cause an ascent in engine speed, which is shown by a segment 413 of the engine speed signal 404 during the predetermined period 414. An increase in the EMP may also cause an ascent in fuel that is injected into cylinders 40, which is shown by a segment 415 of the fuel rate signal 406 during the predetermined period 414.

Although the actual boost pressure signal 408 follows a control target, such as the boost pressure set-point signal 410, during the single-loop control mode, the EBP may cause an engine torque loss. The engine torque loss corresponds to a decrease (designated 416) in the engine torque signal 402 during the predetermined period 414. The EBP decreases engine performance and fuel economy. A dual-loop control system uses the exhaust pressure set-point and the boost pressure set-point as control targets to reduce the engine torque loss.

In step 330, the loop control module 200 may generate a loop control signal LPctrl that indicates a dual-loop control mode. The dual-loop control mode indicates that the VGT 20 and BPV 22 of the turbocharger control system 14 are controlled based on the boost pressure and exhaust pressure of the engine 12. The dual-loop control mode may use dual set-points, such as the boost pressure set-point value BPsetpt and an exhaust pressure set-point EPsetpt, as control targets.

Unlike in the dual-loop control mode, a single set-point, such as the boost pressure set-point BPsetpt, may be used in the single-loop control mode. In the single-loop control mode, the BPV 22 is operated based on the calibrated BPV value 216. The calibrated BPV value 216 may be determined by a calibration procedure that is performed during manufacturing of a vehicle. The calibrated BPV value 216 may be stored in the memory 218 via the calibration procedure. In the dual-loop control mode, the BPV 22 may be operated based on the exhaust pressure set-point EPsetpt without the use of the calibrated BPV value 216. Thus, the calibration procedure may be performed less to generate the calibrated BPV value 216.

In step 332, the set-point selection module 202 may selectively access an exhaust pressure set-point value EPsetpt from exhaust pressure set-point lookup tables 220 based on the loop control signal LPctrl, the engine speed signal EngSpd, and the engine torque signal EngTrq. For example, the set-point selection module 202 selects the exhaust pressure set-point lookup tables 220 when the BPV 22 is in the dual-loop control mode. The set-point selection module 202 accesses the exhaust pressure set-point value EPsetpt stored in the exhaust pressure set-point lookup tables 220. The set-point selection module 202 selects the exhaust pressure set-point values EPsetpt based on the engine speed signal EngSpd and the engine torque signal EngTrq.

In step 334, the EMP error module 222 receives the exhaust pressure set-point value EPsetpt from the set-point selection module 202. The EMP error module 222 also receives an EMP signal ExhPres from the EMP sensor 54. The EMP signal ExhPres indicates exhaust pressure in the exhaust manifolds 50, 52.

In step 336, the EMP error module 222 may generate an EMP error signal empERR based on a difference between the exhaust pressure set-point value EPsetpt and the EMP signal ExhPres. The EMP signal ExhPres may be replaced by other engine parameters, such as an exhaust gas recirculation (EGR) valve position signal.

An engine system may include an EGR system to reduce engine emissions. An EGR system re-circulates exhaust gas back into cylinders. An EGR valve regulates an amount of exhaust gas received by the cylinders during engine operation. Changes in the amount of exhaust gas received by the cylinders may affect an exhaust manifold pressure. The EGR valve position signal may be used instead of the EMP signal ExhPres to indicate the exhaust manifold pressure.

The EMP error module 222 compares the exhaust pressure set-point value EPsetpt to the EMP signal. The EMP error module 222 generates the EMP error signal empERR based on a difference between the exhaust pressure set-point value EPsetpt and the EMP signal ExhPres.

In step 338, the BPV control module 224 may generate a BPV control signal PIDbpv based on the EMP error signal empERR. The BPV control module 224 may be a PID control module with proportional P, integral I, and derivative D values. The EMP error signal empERR is provided based on the exhaust pressure set-point value EPsetpt and the EMP signal ExhPres to achieve desired P, I, and D values for a desired control response. The set-point value EPsetpt may provide smooth transient operation during the dual-loop control mode.

In step 340, the BPV limit module 226 may receive and scale the BPV control signal PIDbpv to be within an operating range of the BPV 22. The BPV limit module 226 generates a scaled BPV signal cBPV based on the BPV control signal PIDbpv. In step 342, the BPV actuation module 214 may receive the scaled BPV signal cBPV and generate a BPV actuation signal aBPV based on the scaled BPV signal cBPV to actuate the BPV 22. Control may iterably perform steps 302-342 during engine operation.

The above-described steps are meant to be illustrative examples; the steps may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a sequential turbocharger, comprising:
a loop control module that generates a loop control mode signal based on an engine speed signal and an engine load signal,
wherein the loop control mode signal indicates one of a single-loop control mode and a dual-loop control mode;
a set-point selection module that determines at least one of a boost pressure set-point value and an exhaust pressure set-point value based on the loop control mode signal, the engine speed signal, and an engine torque signal; and
a loop operation module that operates at least one of a variable geometry turbine (VGT) and a bypass valve (BPV) of the sequential turbocharger during the single-loop control mode based on the boost pressure set-point value and not the exhaust pressure set-point value, and during the dual-loop control mode based on the boost pressure set-point value and the exhaust pressure set-point value.

2. The system of claim 1, wherein the loop control module generates the loop control mode signal that indicates the dual-loop control mode when the engine speed signal is greater than a first predetermined value and when the engine load signal is greater than a second predetermined value, and
wherein the loop control module generates the loop control mode signal to indicate the single-loop control mode at least one of when the engine speed signal is less than or equal to the first predetermined value and when the engine load signal is less than or equal to the second predetermined value.

3. The system of claim 1, further comprising:
an engine speed sensor that generates the engine speed signal; and
a mass airflow (MAF) sensor that generates the engine load signal.

4. The system of claim 1, further comprising an engine torque sensor that generates the engine torque signal based on rates that fuel is injected into cylinders of an engine.

5. The system of claim 1, wherein the set-point selection module selects the boost pressure set-point value when the sequential turbocharger is operated in the single-loop control mode, and
wherein the set-point selection module selects the boost pressure set-point value and the exhaust pressure set-point value when the sequential turbocharger is operated in the dual-loop control mode.

6. The system of claim 1, wherein the loop operation module comprises an error module that generates an error signal based on a difference between the boost pressure set-point value and a manifold absolute pressure signal, and
wherein the error module generates the error signal based on a difference between the exhaust pressure set-point value and an exhaust manifold pressure signal.

7. The system of claim 6, wherein the error module generates the error signal based on a difference between the exhaust pressure set-point value and an exhaust gas recirculation valve position signal.

8. The system of claim 6, wherein the loop operation module further comprises:
a second control module that generates a control signal based on the error signal;
a limit module that generates a scaled signal based on the control signal; and
an actuation module that generates an actuation signal based on the scaled signal to actuate at least one of the BPV and vanes in the VGT,
wherein the second control module signals the actuation module to actuate the BPV based on a calibrated BPV value during the single-loop control mode, and
wherein the calibrated BPV value is determined based on opening of the vanes in the VGT.

9. The system of claim 6, wherein the loop operation module further comprises:
a second control module that generates a control signal based on the error signal;
a limit module that generates a scaled signal based on the control signal; and
an actuation module that generates an actuation signal based on the scaled signal to actuate at least one of the BPV and vanes in the VGT,
wherein the actuation module actuates the BPV to a fully closed position based on a relationship between the engine speed and the engine load.

10. The system of claim 1, wherein the loop operation module:
operates the VGT and the BPV during the single-loop control mode based on the boost pressure set-point value and not the exhaust pressure set-point value; and
operates the VGT and the BPV during the dual-loop control mode based on the boost pressure set-point value and the exhaust pressure set-point value.

11. The system of claim 1, wherein the set-point selection module determines the boost pressure set-point value and the exhaust pressure set-point value based on the loop control mode signal, the engine speed signal, and the engine torque signal.

12. A method of controlling a sequential turbocharger, comprising:
generating a loop control mode signal based on an engine speed signal and an engine load signal;
indicating one of a single-loop control mode and a dual-loop control mode via the loop control mode signal;
determining at least one of a boost pressure set-point value and an exhaust pressure set-point value based on the loop control mode signal, the engine speed signal, and an engine torque signal; and
operating a variable geometry turbine (VGT) of the sequential turbocharger during the single-loop control mode based on the boost pressure set-point value and not the exhaust pressure set-point value, and during the dual-loop control mode based on the boost pressure set-point value and the exhaust pressure set-point value.

13. The method of claim 12, further comprising generating the loop control mode signal that indicates the dual-loop control mode when the engine speed signal is greater than a first predetermined value and when the engine load signal is greater than a second predetermined value; and
generating the loop control mode signal to indicate the single-loop control mode at least one of when the engine speed signal is less than or equal to the first predetermined value and when the engine load signal is less than or equal to the second predetermined value.

14. The method of claim 12, further comprising:
generating the engine speed signal by an engine speed sensor; and
generating the engine load signal by a mass airflow (MAF) sensor.

15. The method of claim 12, further comprising generating the engine torque signal based on rates that fuel is injected into cylinders of an engine.

16. The method of claim 12, further comprising:

selecting the boost pressure set-point value when the sequential turbocharger is operated in the single-loop control mode; and selecting the boost pressure set-point value and the exhaust pressure set-point value when the sequential turbocharger is operated in the dual-loop control mode.

17. The method of claim 12, further comprising:

generating an error signal based on a difference between the boost pressure set-point value and a manifold absolute pressure signal; and generating the error signal based on a difference between the exhaust pressure set-point value and an exhaust manifold pressure signal.

18. The method of claim 17, further comprising generating the error signal based on a difference between the exhaust pressure set-point value and an exhaust gas recirculation valve position signal.

19. The method of claim 17, further comprising:
generating a control signal based on the error signal;
generating a scaled signal based on the control signal; and
generating an actuation signal based on the scaled signal to actuate at least one of the BPV and vanes in the VGT.

20. A system for a sequential turbocharger, comprising:

a loop control module that generates a loop control mode signal based on an engine speed signal and an engine load signal, wherein the loop control mode signal indicates one of a single-loop control mode and a dual-loop control mode;

a set-point selection module that determines a boost pressure set-point value and an exhaust pressure set-point value based on the loop control mode signal, the engine speed signal, and an engine torque signal; and a loop operation module that operates a bypass valve of the sequential turbocharger during the single-loop control mode based on the boost pressure set-point value and not the exhaust pressure set-point value, and during the dual-loop control mode based on the boost pressure set-point value and the exhaust pressure set-point value.

* * * * *